Oct. 23, 1956  D. C. CURRIER  2,767,590
CONVEYOR PULLEYS
Filed March 4, 1954  3 Sheets-Sheet 1

INVENTOR.
Donald C. Currier,
BY
Osgood H. Dowell
Atty.

Oct. 23, 1956 — D. C. CURRIER — 2,767,590
CONVEYOR PULLEYS
Filed March 4, 1954 — 3 Sheets-Sheet 2

INVENTOR.
Donald C. Currier,
BY Osgood H. Dowell
Atty.

Oct. 23, 1956   D. C. CURRIER   2,767,590
CONVEYOR PULLEYS
Filed March 4, 1954   3 Sheets-Sheet 3
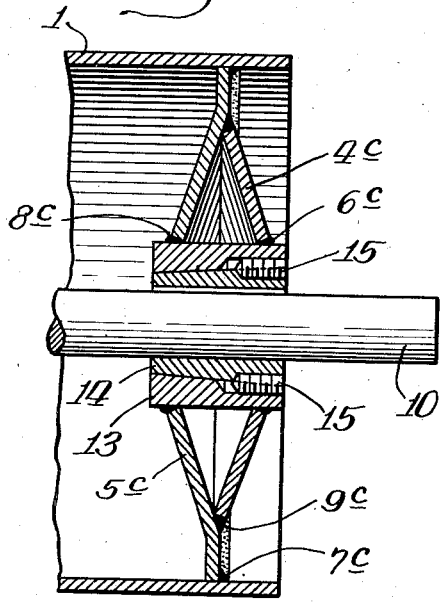
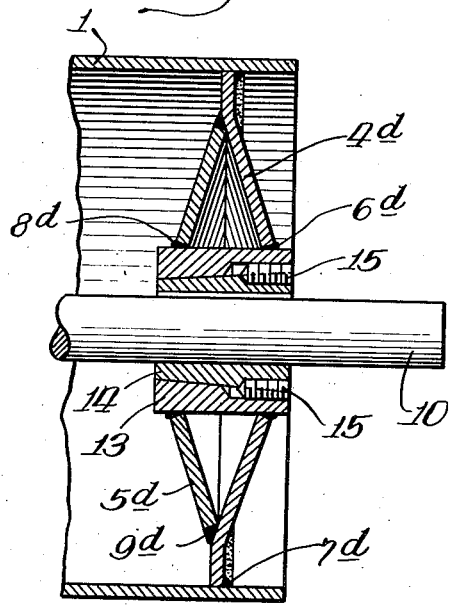
INVENTOR.
Donald C. Currier,
BY Osgood H. Dowell
Atty.

United States Patent Office 2,767,590
Patented Oct. 23, 1956

2,767,590

CONVEYOR PULLEYS

Donald C. Currier, Mishawaka, Ind., assignor to Dodge Manufacturing Corporation, Mishawaka, Ind., a corporation of Indiana Application March 4, 1954, Serial No. 414,040

6 Claims. (Cl. 74—230.3)

Pulleys having wide rims and twin hubs within the rims are referred to herein as conveyor pulleys, being commonly used as guide pulleys and tension pulleys for conveyor belts, including elevator belts of the bucket type.

Under many conditions of service, the loads imposed on conveyor pulleys by belt tension are severe, being commonly as high as 2,000 pounds or more on pulleys for moderate duties and in many cases very much higher on pulleys for heavier duties.

A conveyor pulley of known type comprises a cylindric shell constituting the rim and annular discs connecting the rim to the hubs, said discs being welded to or otherwise fixed on the hubs and welded to the rim. The rims of such pulleys are usually of heavy gauge sheet metal or rolled steel plate, though they are also made in some cases from commercial tubing. The discs are usually cut from rolled steel plates.

In the operative use of ordinary pulleys of said type having each hub connected to the rim only by an end disc, deflection of the pulley shaft under imposed loads tends to cause pivoting or canting of the hubs in the end discs, with resultant imposition on the discs of severe twisting and bending forces. The consequent strains and stresses in the discs, which change in every degree of rotation of the pulley, tend in course of time to cause rupture or development of weak portions in the discs by fatigue of metal.

To resist canting, the hubs have in some instances been braced by radiating ribs welded to the hubs and to the discs. Such bracing, requiring twice as many welds as the number of ribs, is complicated and expensive and does not fully relieve the discs from twisting and bending forces.

The present invention aims to provide a pulley of the general type above referred to of a construction which is simpler, more highly resistant to deformation by shaft deflection, and easier to manufacture than prior pulleys of said type having the hubs braced by radiating ribs.

A characteristic of the invention is that the pulley hubs are rigidly connected to the rim by pairs of annular discs, those of each pair being spaced a substantial distance from each other on the hub with which they are associated. The hubs are thereby held so rigidly as to resist shaft deflection and to minimize canting of the hubs under heavy loads. A further feature of the invention is that the discs associated with each hub are of unequal diameters and formed and arranged so that the discs of smaller diameter have their peripheral portions adjoining and welded to the discs of larger diameter, the latter being fitted in and welded to the rim. This construction eliminates problems and difficulties that would be incident to welding both discs of each pair to the rim.

A pulley embodying the invention in one practicable form is shown for illustration in Figs. 1 to 4 of the accompanying drawings, other embodiments being shown in the remaining figures.

Figs. 7 and 8 are longitudinal sections of end portions of pulleys embodying the invention in still other specific forms.

Figure 1:
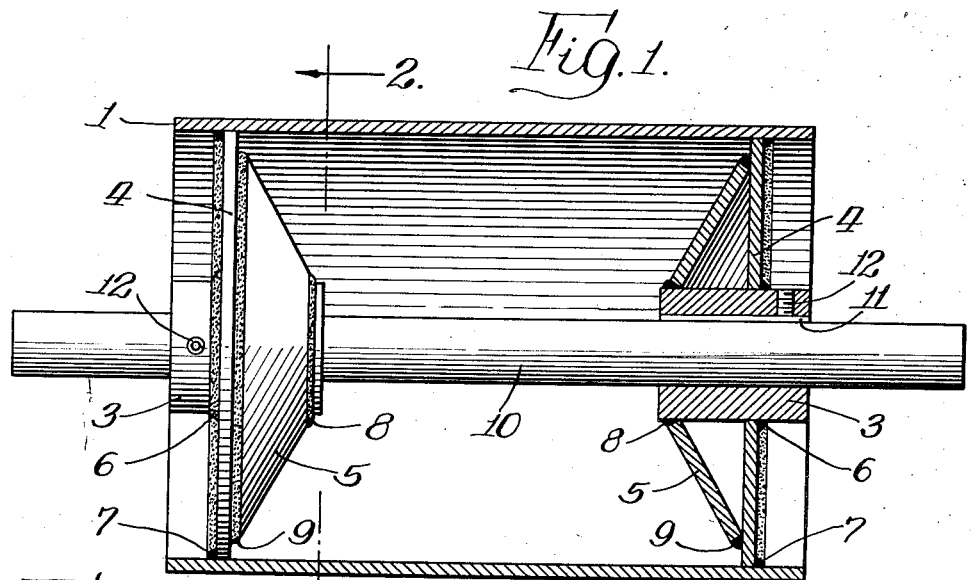
Fig. 1 is a longitudinal section of a pulley embodying the invention, shown mounted on a shaft to be supported in bearings adjacent to the ends of the pulley, said shaft and one of the hub and disc assemblies of the pulley being shown in side elevation.
Figures 2, 3:
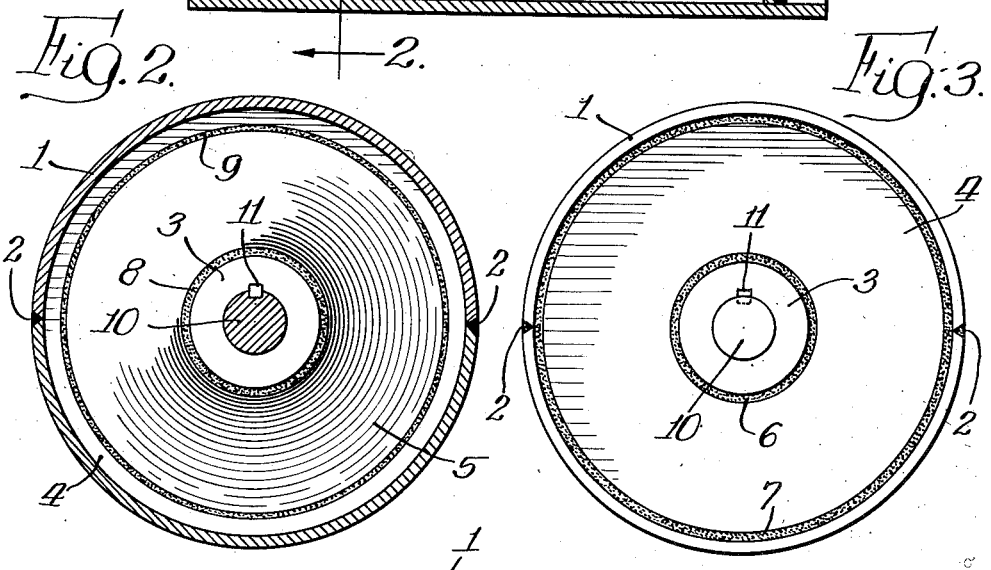
Fig. 2 is a cross section taken on the line 2—2 of Fig. 1, showing the inside face of a hub and disc assembly.
Fig. 3 is an end elevation of the pulley, showing the outside face of a hub and disc assembly.

Referring first to the pulley shown in Figs. 1 to 4, the rim 1 thereof may be, for example, a cylindric shell of rolled steel plate made in two or more longitudinal pieces or segments joined by welding. For convenience in manufacturing, as hereinafter explained, the rim is preferably made in two halves or complemental segments of semicircular cross-section. Fillet welds joining these segments are indicated at 2 in Figs. 2 and 3. These welds extend the full length of the rim.

Though the rim is shown as of uniform diameter, it may be formed as of somewhat larger diameter at the middle than at the ends, for production of a crown-faced pulley, or of a diameter increasing from one end to the other in the case of a tapered guide pulley.

Within the rim are a pair of appropriately spaced hubs 3, each in assembly with a pair of annular discs 4 and 5 fixed on the hub at a substantial distance from each other. The discs adjacent to the outer ends of the hubs are referred to as the outer discs, and those adjacent to the inner ends of the hub are referred to as the inner discs. The discs of each assembly are of different diameters, at least one of them being conical or otherwise suitably dish-shaped, and the discs of each assembly being arranged with the peripheral portions of the smaller diameter discs adjoining and welded to the larger diameter discs, the latter being fitted in and welded to the rim. The two hub and disc assemblies are identical, the pulley structure being symmetrical with respect to a medial transverse plane.

In the specific construction shown in Figs. 1 to 4, the outer discs 4 are of greater diameter than the inner discs 5, said outer discs being preferably straight and the inner discs conical. Both discs of each assembly could be conical, being arranged with their confronting surfaces diverging toward the hub. The several discs may be of rolled steel plate, straight discs being cut from such plate and conical discs being pressed from flat plates.

The outer discs 4 may be welded to or otherwise rigidly fixed on the hubs or formed integrally therewith in the case of hubs pressed from steel plates. As shown, said outer discs are fitted on and welded to the hubs by annular fillet welds 6. Said discs are fitted in and welded to the rim by annular fillet welds 7.

The conical inner discs 5 have their smaller diameter ends fitted on and welded to the hubs by annular fillet welds 8, and their larger diameter ends contiguous to and welded to the outer discs by annular fillet welds 9. The last mentioned welds are preferably in near proximity to but clear of the rim, whereby the inner ends of the hubs are held by the inner discs practically or nearly as if directly from the rim.

Figure 4:
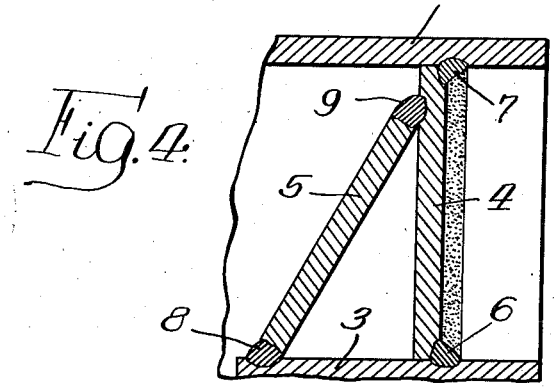
Fig. 4 is a sectional view on an enlarged scale of a fragment of the pulley structure, showing cross-sectional areas of certain fillet welds.

In the drawings, the various welds of the pulley structure are conventionally indicated in cross-section by black spots denoting fillets of welding metal or so-called filler metal formed in the welding operation. The welding is done by the submerged arc process, which is described in chapter 13 of the Welder's Handbook, 3rd Edition, published in 1950 by the American Welding Society of New York. In this process a union of adjacent metal parts is produced by heating with an electric arc drawn between the work and a bare metal electrode consisting of a wire which as its tip melts is fed forwardly, the operation being conducted in a flux. As the wire melts, the molten filler metal is deposited in corners or interstices in the work and unites or amalgamates by fusion with adjacent portions of the metal parts to be joined, so that the cross-sectional areas of the welds are considerably larger than as represented by said black spots. In Fig. 4 the cross-sectional areas of certain of the welds is indicated by fine cross-hatching.

In manufacturing the pulley, the discs associated with each hub are welded thereto and to each other at 9. The two hub and disc assemblies are then placed in proper position in one of the two halves or segments of the rim and "tacked" thereto by welding the discs 4 to said segment at only a few points, by small blobs of welding metal. The other rim segment is then applied and joined to the first by welding along their longitudinal edges. The rim is then welded all around to the discs 4, making the annular welds 7 and completing the structure.

These operations are comparatively simple, each annular weld being easily made while rotating the work relative to the welding arc. The hubs may be temporarily fixed on arbors rotated during the making of the welds 6, 8 and 9, and both hubs may be fixed on a shaft rotated during the making of the welds 7.

If the pulley rim be made of one piece of steel plate rolled into tubular form, then before joining the adjacent edges thereof the hub and disc assemblies may be placed in proper position therein and tack-welded thereto. The said edges are then welded together, and the rim is then welded all around to the discs of larger diameter, which in this instance are the outer discs 4. So also if the rim be made of commercial tubing, or as a shell of rolled steel plate having one or more seams completed by welding before application to the hub and disc assemblies, the said assemblies are placed therein in proper position and tack-welded to the rim, which is then welded all around to the said discs of larger diameter.

The welds 7 between the rim and larger diameter discs 4 of the hub and disc assemblies are in the anterior corners between the rim and said discs, which corners are accessible to welding equipment through the open ends of the rim. As only the larger diameter discs of the respective assemblies are joined directly to the rim, no such problem is presented as that of welding both the outer and inner discs of said assemblies to the rim.

The pulley is shown mounted on a shaft 10, the pulley hubs being fitted on the shaft, keyed thereto by keys 11 and fastened thereto by set-screws 12. It will be understood that the pulley when installed for service has its shaft rotatably mounted in suitably supported bearings adjacent to the ends of the pulley. Other types of hubs than those shown may be employed. For some uses of the invention, it may be desirable to provide hubs having antifriction bearings for supporting the pulley rotatably on a stationary shaft.

In the operative use of the pulley on a supporting shaft, assuming a sufficient load thereon to deflect the shaft, the outer discs 4 are in compression above the shaft and in tension below, while the inner discs 5 are in tension above the shaft and in compression below. Thus the load forces on the outer and inner discs are in opposite directions, the load on the pulley being transmitted to the shaft by the outer discs, while the inner ends of the hubs are held by the inner discs in fixed relation to the outer discs.

The expression "above the shaft" as used in the preceding paragraph means at the side of the shaft at which the load due to belt tension is applied, and the expression "below the shaft" means at the opposite side thereof.

Although the loads on the outer discs are greater than would be imposed thereon if the inner discs were omitted, yet the advantage is gained of a near approach to a condition in which the disc stresses are the effects of only direct load forces, rather than combined effects of load forces and bending forces, with the result that bending stresses in the discs are so low as to be practically negligible.

Pulleys embodying the invention may be of various specific constructions with respect to the form and arrangement of the discs. The discs of larger diameter may be either the outer or inner discs and either straight or conical. If the outer discs are straight, the inner discs should be conical or otherwise suitably dish-shaped. If the outer discs are conical, the inner discs may be either straight or conical.

Figure 5:
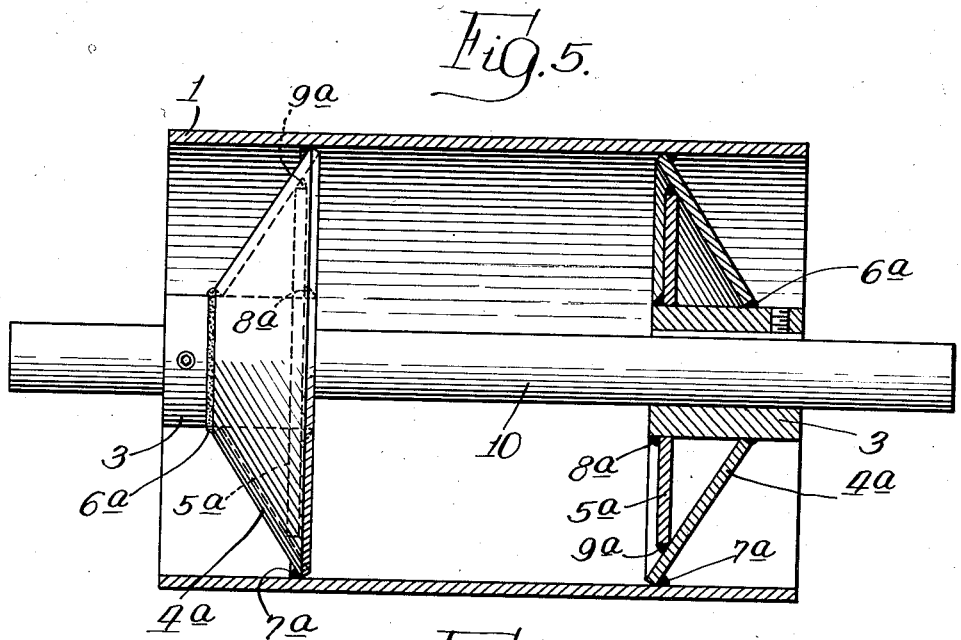
Figs. 5 and 6 are sectional views corresponding to Fig. 1 of pulleys embodying the invention in other forms.

In the structure shown in Fig. 5, the outer discs $4^a$ are conical and of larger diameter than that of the inner discs $5^a$. Otherwise the structure is substantially similar to that of Fig. 1. The welds designated in Fig. 5 by the symbols $6^a$, $7^a$, $8^a$ and $9^a$ correspond to those of Fig. 1. In the operative use of the pulley of Fig. 5, the load thereon is transmitted to the hubs by the outer discs $4^a$, while the inner discs support the inner ends of the hubs as if from the rim.

Figure 6:
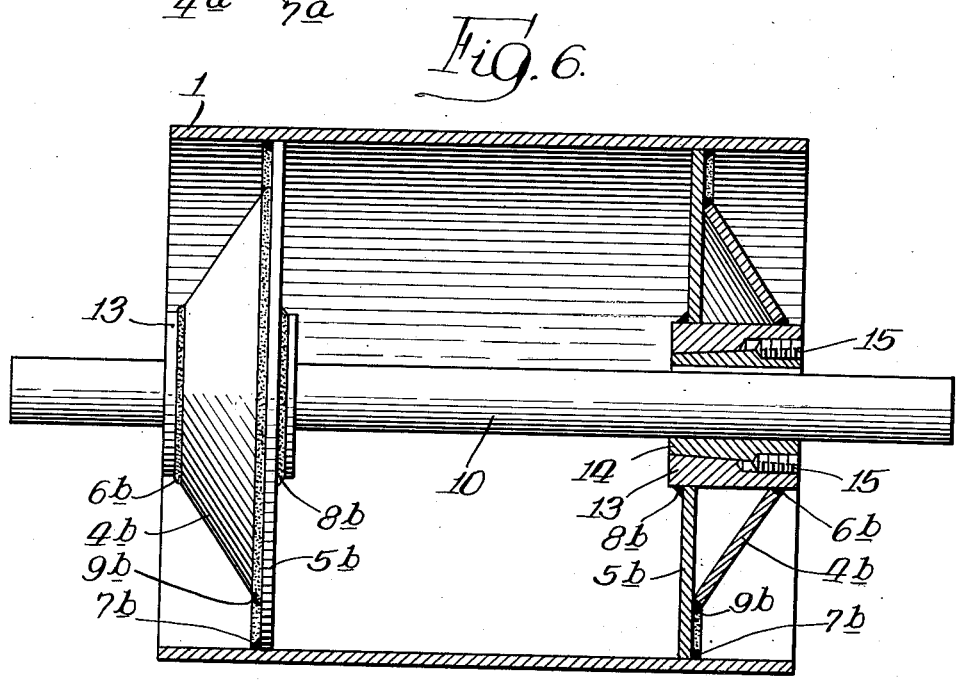

The pulley shown in Fig. 6 has straight inner discs $5^b$ and conical outer discs $4^b$, the inner discs being of larger diameter than the outer discs. The discs are fitted on and joined to the hubs 13 by annular fillet welds $6^b$ and $8^b$. The peripheries of the outer discs are joined to the inner discs by the annular welds $9^b$, and said inner discs are joined to the rim by the annular welds $7^b$. In operative use of the pulley, the load thereon is transmitted to the hubs by the outer discs and portions of the inner discs between the rim and welds $9^b$.

In the structure shown in Fig. 6 the hubs 13 are of the taper-bushed type, i. e. interiorly tapered and attachable to the shaft by wedging a tapered split contractible bushing 14 between the hub and shaft. The wedging of the bushing is effected in this instance by tightening screws 15, which are in threaded engagement with only the hub and bear against shoulders on the bushing. Upon withdrawing the screws, they can be operated in other holes as jack screws for dewedging the bushing. The screw means for the wedging and dewedging operations are in accordance with a disclosure in patent to Firth, No. 2,402,743, of June 25, 1946.

In a pulley of which one end portion is shown in Fig. 7, each hub and disc assembly comprises a conical outer disc $4^c$ and a flat-brimmed conical inner disc $5^c$ of greater diameter than that of the outer disc, the discs being joined to the hub and to each other by the annular welds $6^c$, $8^c$ and $9^c$, and the larger diameter inner disc being welded to the rim by the annular weld $7^c$.

Fig. 8 shows one end portion of a pulley in which each hub and disc assembly comprises a flat-brimmed conical outer disc $4^d$ and a conical inner disc $5^d$ of less diameter than that of said outer disc. The various annular welds of the structure are designated by the symbols $6^d$, $8^d$, $9^d$ and $7^d$.

In each of the structures shown, the hub and disc assemblies constitute rigid annular double-walled trusses having their peripheries welded all around to the pulley rim, giving great strength and rigidity and high resistance to deformation by shaft deflection.

Of the several structures illustrated, that of Fig. 1 is deemed preferable, though the others may be preferred in many cases. In the structures shown in Figs. 5 and 6, the welds joining the larger diameter discs to the rim are located further from the ends of the pulley than in Fig. 1, which is of advantage for better reinforcement of the central position of the rim. Another advantage of a structure according to either Fig. 5 or Fig. 6 is that it allows cutting off the extremities of the rim of a stock pulley to reduce the face width thereof in case such a reduction might be desired.

Though dish-shaped discs of pulleys embodying the invention are preferably conical, they may be of other forms suitable for the purpose of the invention, including concavo-convex forms and flat-rimmed dished forms.

I claim:

1. A conveyor pulley comprising a cylindric shell constituting the rim, twin hubs within the rim, and two pairs of annular discs respectively connecting the respective hubs to the rim, each disc being a single piece, the discs of each pair being welded directly on the associated hub at a substantial distance from each other, the discs of each pair being of different diameters and at least one of them being dished, the smaller diameter discs of said pairs having their peripheral portions adjoining and welded to the larger diameter discs of said pairs by annular fillet welds between the peripheries of the smaller diameter discs and the adjacent sides of the larger diameter discs, the difference in diameters of the outer and inner discs being such that said welds are substantially spaced from the rim, said larger diameter discs being fitted in the rim in spaced relation to the ends thereof and welded to the rim by annular fillet welds in the outer corners between said larger diameter discs and the rim, the peripheries of the last mentioned discs terminating transverse to the rim on the interior thereof.

2. A conveyor pulley comprising a cylindric shell constituting the rim, twin hubs within the rim, and two pairs of annular discs respectively connecting the respective hubs to the rim, each disc being a single piece, the discs of each pair being welded directly on the associated hub at a substantial distance from each other, at least one disc of each pair being dished, the inner discs of said pairs being of less diameter than that of the outer discs, said inner discs having their peripheral portions adjoining and welded to the outer discs by annular fillet welds between the peripheries of the inner discs and the adjacent sides of the outer discs, the difference in diameters of the outer and inner discs being such that said welds are substantially spaced from the rim, the outer discs being fitted in the rim in spaced relation to the ends thereof and welded to the rim by annular fillet welds in the outer corners between the outer discs and the rim, the peripheries of the last mentioned discs terminating transverse to the rim on the interior thereof.

3. A conveyor pulley comprising a cylindric shell constituting the rim, twin hubs within the rim, and two pairs of annular discs respectively connecting the respective hubs to the rim, the discs of each pair being rigidly fixed on the associated hub at a substantial distance from each other, the outer discs of said pairs being straight and of larger diameter than that of the inner discs of said pairs, said inner discs being dished and having their peripheral portions adjoining and welded to the outer discs by annular fillet welds between the peripheries of the inner discs and the adjacent sides of the outer discs, the difference in diameters of the outer and inner discs being such that said welds are substantially spaced from the rim, the outer discs being fitted in the rim in spaced relation to the ends thereof and welded to the rim by annular fillet welds in the outer corners between the outer discs and the rim.

4. A conveyor pulley comprising a cylindric shell constituting the rim, twin hubs within the rim, and two pairs of annular discs respectively connecting the respective hubs to the rim, each disc being a single piece, the discs of each pair being welded directly on the associated hub at a substantial distance from each other, the outer discs of said pairs being dished and of larger diameter than that of the inner discs of said pairs, said inner discs having their peripheral portions adjoining and welded to said outer discs by annular fillet welds between the peripheries of the inner discs and the adjacent sides of the outer discs, the difference in diameters of the outer and inner discs being such that said welds are substantially spaced from the rim, the outer discs being fitted in the rim in spaced relation to the ends thereof and welded to the rim by annular fillet welds in the outer corners between the outer discs and the rim, the peripheries of the last mentioned discs terminating transverse to the rim on the interior thereof.

5. A conveyor pulley comprising a cylindric shell constituting the rim, twin hubs within the rim, and two pairs of annular discs respectively connecting the respective hubs to the rim, the discs of each pair being rigidly fixed on the associated hub at a substantial distance from each other, the inner discs of said pairs being of larger diameter than the outer discs of said pairs, at least one disc of each pair being dished, said outer discs having their peripheral portions adjoining and welded to said inner discs by annular fillet welds between the peripheries of the outer discs and the adjacent sides of the inner discs, the difference in diameters of the outer and inner discs being such that said welds are substantially spaced from the rim, said inner discs being fitted in the rim in spaced relation to the ends thereof and welded to the rim by annular fillet welds in the outer corners between said inner discs and the rim.

6. A conveyor pulley comprising a cylindric shell constituting the rim, twin hubs within the rim, and two pairs of annular discs respectively connecting the respective hubs to the rim, the discs of each pair being rigidly fixed on the associated hub at a substantial distance from each other, the inner discs of said pairs being straight and of larger diameter than that of the outer discs of said pairs, said outer discs having their peripheral portions adjoining and welded to said inner discs by annular fillet welds between the peripheries of the outer discs and the adjacent sides of the inner discs, the difference in diameters of the outer and inner discs being such that said welds are substantially spaced from the rim, said inner discs being fitted in the rim in spaced relation to the ends thereof and welded to the rim by annular fillet welds in the outer corners between said inner discs and the rim.

References Cited in the file of this patent

UNITED STATES PATENTS

| | | |
|---|---|---|
| 867,350 | Dehler | Oct. 1, 1907 |
| 1,371,666 | Close et al. | Mar. 15, 1921 |
| 1,609,377 | Millspaugh | Dec. 7, 1926 |
| 1,648,626 | Smith | Nov. 8, 1927 |
| 1,748,473 | Fisk | Feb. 25, 1930 |
| 2,355,743 | Mueller | Aug. 15, 1944 |

FOREIGN PATENTS

| | | |
|---|---|---|
| 190,263 | Great Britain | Dec. 21, 1922 |